(12) United States Patent
Weingaertner et al.

(10) Patent No.: US 12,043,909 B2
(45) Date of Patent: Jul. 23, 2024

(54) SOLID OXIDE ELECTROLYZER SYSTEMS CONTAINING HYDROGEN PUMP AND METHOD OF OPERATING THEREOF

(71) Applicant: Bloom Energy Corporation, San Jose, CA (US)

(72) Inventors: David Weingaertner, Sunnyvale, CA (US); Martin Perry, Mountainview, CA (US); Michael Gasda, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 17/734,423

(22) Filed: May 2, 2022

(65) Prior Publication Data

US 2022/0349076 A1    Nov. 3, 2022

Related U.S. Application Data

(60) Provisional application No. 63/183,275, filed on May 3, 2021.

(51) Int. Cl.
| | | |
|---|---|---|
| *C25B 15/08* | (2006.01) | |
| *B01D 53/26* | (2006.01) | |
| *B01D 53/32* | (2006.01) | |
| *C25B 1/04* | (2021.01) | |
| *C25B 9/19* | (2021.01) | |
| *C25B 13/07* | (2021.01) | |

(52) U.S. Cl.
CPC .......... *C25B 15/083* (2021.01); *B01D 53/265* (2013.01); *B01D 53/326* (2013.01); *C25B 1/04* (2013.01); *C25B 9/19* (2021.01); *C25B 13/07* (2021.01); *C25B 15/087* (2021.01)

(58) Field of Classification Search
None
See application file for complete search history.

(56) References Cited

U.S. PATENT DOCUMENTS

| | | |
|---|---|---|
| 7,781,112 B2 | 8/2010 | Sridhar et al. |
| 8,053,136 B2 | 11/2011 | Hickey et al. |
| 8,071,241 B2 | 12/2011 | Sridhar et al. |
| 8,071,246 B2 | 12/2011 | Mitlitsky et al. |
| 8,293,412 B2 | 10/2012 | McElroy |
| 8,445,150 B2 | 5/2013 | Ballantine |
| 8,802,308 B2 | 8/2014 | Gottmann et al. |

(Continued)

OTHER PUBLICATIONS

Extended European Search Report dated Oct. 31, 2022 in corresponding European Application No. 22171168.2.

(Continued)

*Primary Examiner* — Wojciech Haske
(74) *Attorney, Agent, or Firm* — THE MARBURY LAW GROUP PLLC

(57) ABSTRACT

A method of operating a solid oxide electrolyzer system includes providing a water inlet stream to at least one solid oxide electrolyzer cell (SOEC), generating a wet hydrogen product stream from the at least one SOEC, providing the wet hydrogen product stream to at least one hydrogen pump, generating a compressed hydrogen product and an unpumped effluent in the at least one hydrogen pump, and recycling at least a portion of the unpumped effluent upstream of the at least one hydrogen pump.

6 Claims, 3 Drawing Sheets

(56) References Cited

U.S. PATENT DOCUMENTS

Figure 1:
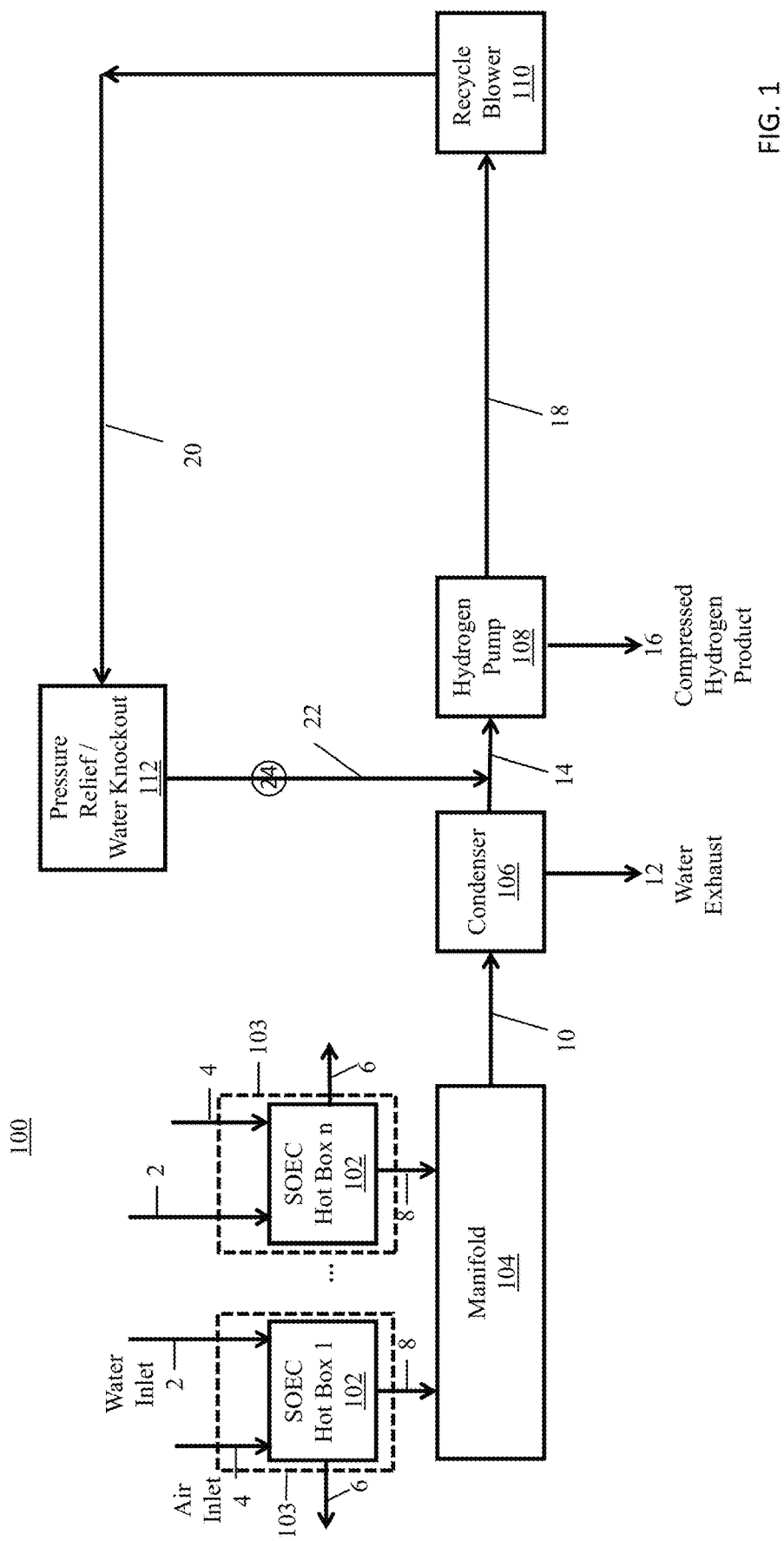

| | | |
|---|---|---|
| 9,059,600 B2 | 6/2015 | Godrich et al. |
| 9,461,320 B2 | 10/2016 | Ballantine et al. |
| 10,648,089 B2 | 5/2020 | Preston |
| 10,756,361 B2 | 8/2020 | Dristy |
| 2009/0130505 A1* | 5/2009 | McElroy ............... H01M 8/186 |
| | | 429/418 |
| 2013/0284591 A1 | 10/2013 | Delahaye et al. |
| 2020/0343567 A1 | 10/2020 | Wakita et al. |
| 2021/0359324 A1 | 11/2021 | Armstrong |

OTHER PUBLICATIONS

Skyre Brochure, https://www.skyre-inc.com/wp-content/uploads/2019/08/Skyre_Brochure_H2C-06-200_Final_032019.pdf, last downloaded Mar. 2019.

* cited by examiner

SOLID OXIDE ELECTROLYZER SYSTEMS CONTAINING HYDROGEN PUMP AND METHOD OF OPERATING THEREOF

PRIORITY

This application is a non-provisional application that claims the benefit of U.S. Provisional Application No. 63/183,275, filed on May 3, 2021, the contents of which are herein incorporated by reference in their entirety.

FIELD

The present disclosure is directed generally to electrolyzer systems and specifically to solid oxide electrolyzer cell (SOEC) systems with a hydrogen pump.

BACKGROUND

Solid oxide fuel cells (SOFC) can be operated as electrolyzer cells in order to produce hydrogen and oxygen from water. Such cells are referred to as solid oxide electrolyzer cells (SOEC). In SOFC mode, oxygen ions are transported from the cathode side (air) to the anode side (fuel) and the driving force is the chemical gradient of partial pressure of oxygen across the electrolyte. In SOEC mode, a positive potential is applied to the air side of the cell and the oxygen ions are transported from the fuel side to the air side. Since the cathode and anode are reversed between SOFC and SOEC (i.e. SOFC cathode is SOEC anode, and SOFC anode is SOEC cathode), the SOFC cathode (SOEC anode) is referred to as the air electrode, and the SOFC anode (SOEC cathode) is referred to as the fuel electrode. A SOEC includes a ceramic (e.g., solid oxide) electrolyte (e.g., yttria, scandia and/or ceria stabilized zirconia), an air electrode, and a fuel electrode. During SOEC mode, water in the fuel stream is reduced ($H_2O + 2e^- \rightarrow O^{-2} + H_2$) to form $H_2$ gas and $O^{-2}$ ions, $O^{-2}$ ions are transported through the solid electrolyte, and then oxidized on the air side ($2O^{-2} \rightarrow O_2$) to produce molecular oxygen.

SUMMARY

According to one embodiment, a method of operating a solid oxide electrolyzer system includes providing a water inlet stream to at least one solid oxide electrolyzer cell (SOEC), generating a wet hydrogen product stream from the at least one SOEC, providing the wet hydrogen product stream to at least one hydrogen pump, generating a compressed hydrogen product and an unpumped effluent in the at least one hydrogen pump, and recycling at least a portion of the unpumped effluent upstream of the at least one hydrogen pump.

In one embodiment, the method further comprises condensing water and exhausting the water from the wet hydrogen product stream prior to providing the wet hydrogen product stream to the at least one hydrogen pump. At least a portion of the unpumped effluent may be recycled by a blower to an inlet of the at least one hydrogen pump and/or recycled by the blower through at least one condenser into the water inlet stream. The at least one hydrogen pump may comprise an electrochemical hydrogen pump which generates the compressed hydrogen product comprising greater than 99 volume percent hydrogen. Optionally, the method may further comprise providing the compressed hydrogen product from the at least one hydrogen pump to at least one additional higher pressure hydrogen pump, generating an additional higher pressure compressed hydrogen product and additional unpumped effluent in the least one additional higher pressure hydrogen pump, and recycling at least a portion of the additional unpumped effluent into the water inlet stream.

According to another embodiment, a solid oxide electrolyzer system comprises a water inlet conduit fluidly connected to a hot box containing at least one solid oxide electrolyzer cell (SOEC), at least one hydrogen pump, at least one product conduit fluidly connecting a product outlet of the hot box to an inlet of the at least one hydrogen pump, a compressed hydrogen product conduit connected to a compressed hydrogen product outlet of the at least one hydrogen pump, and at least one recycle conduit connected to an unpumped effluent outlet of the at least one hydrogen pump and configured to recycle at least a portion of the unpumped effluent upstream of the at least one hydrogen pump.

In one embodiment, the system further comprises a condenser fluidly connected to the at least one product conduit. The system may also include a blower configured to recycle at least the portion of the unpumped effluent to an inlet of the at least one hydrogen pump and/or to the water inlet conduit. The system may optionally include at least one additional higher pressure hydrogen pump fluidly connected to the compressed hydrogen product conduit and configured to generate an additional higher pressure compressed hydrogen product and additional unpumped effluent, and at least one hydrogen recycle conduit fluidly connected between an additional unpumped effluent outlet of the at least one additional higher pressure hydrogen pump and the water inlet conduit.

FIGURES

Figure 2:
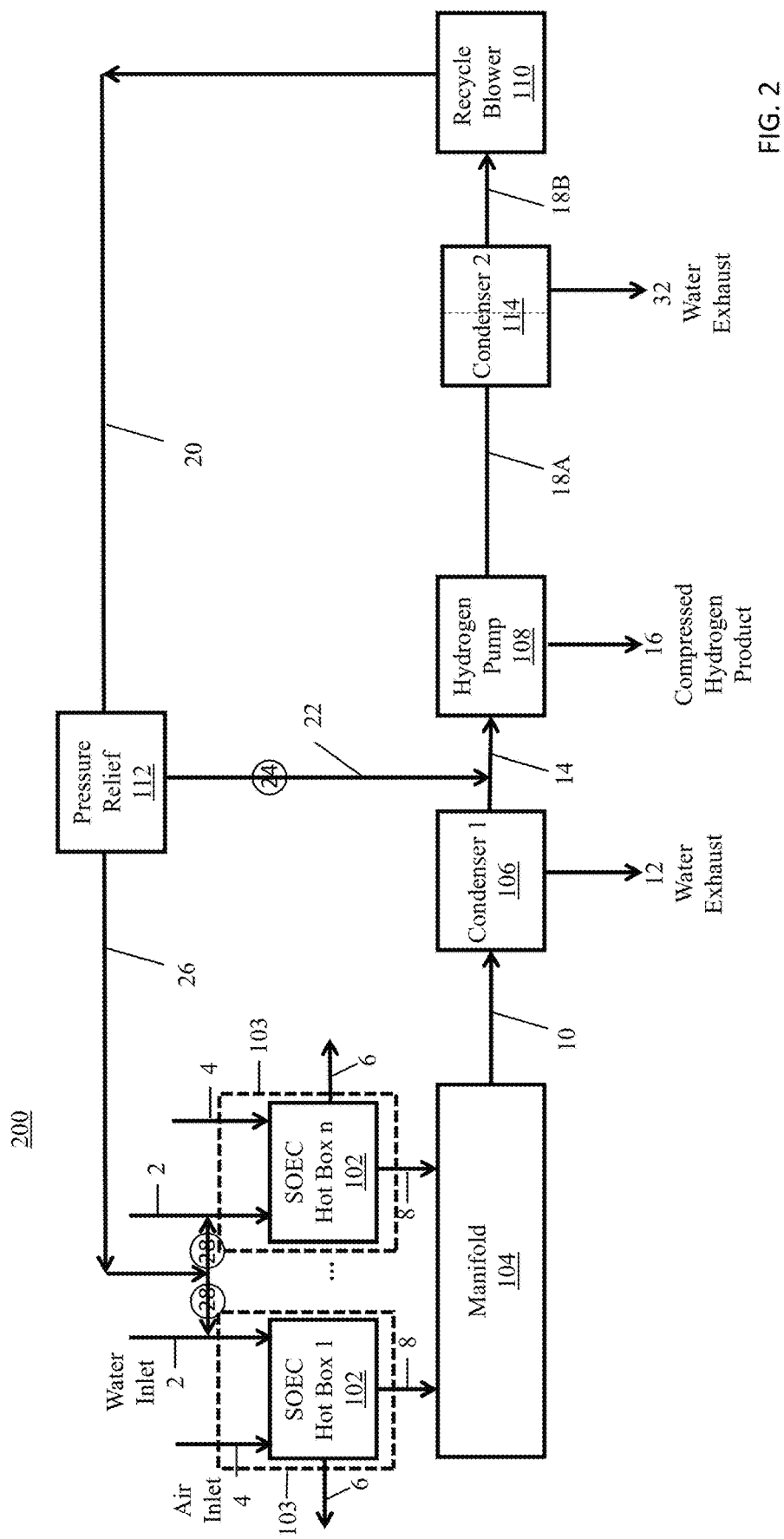
Figure 3:
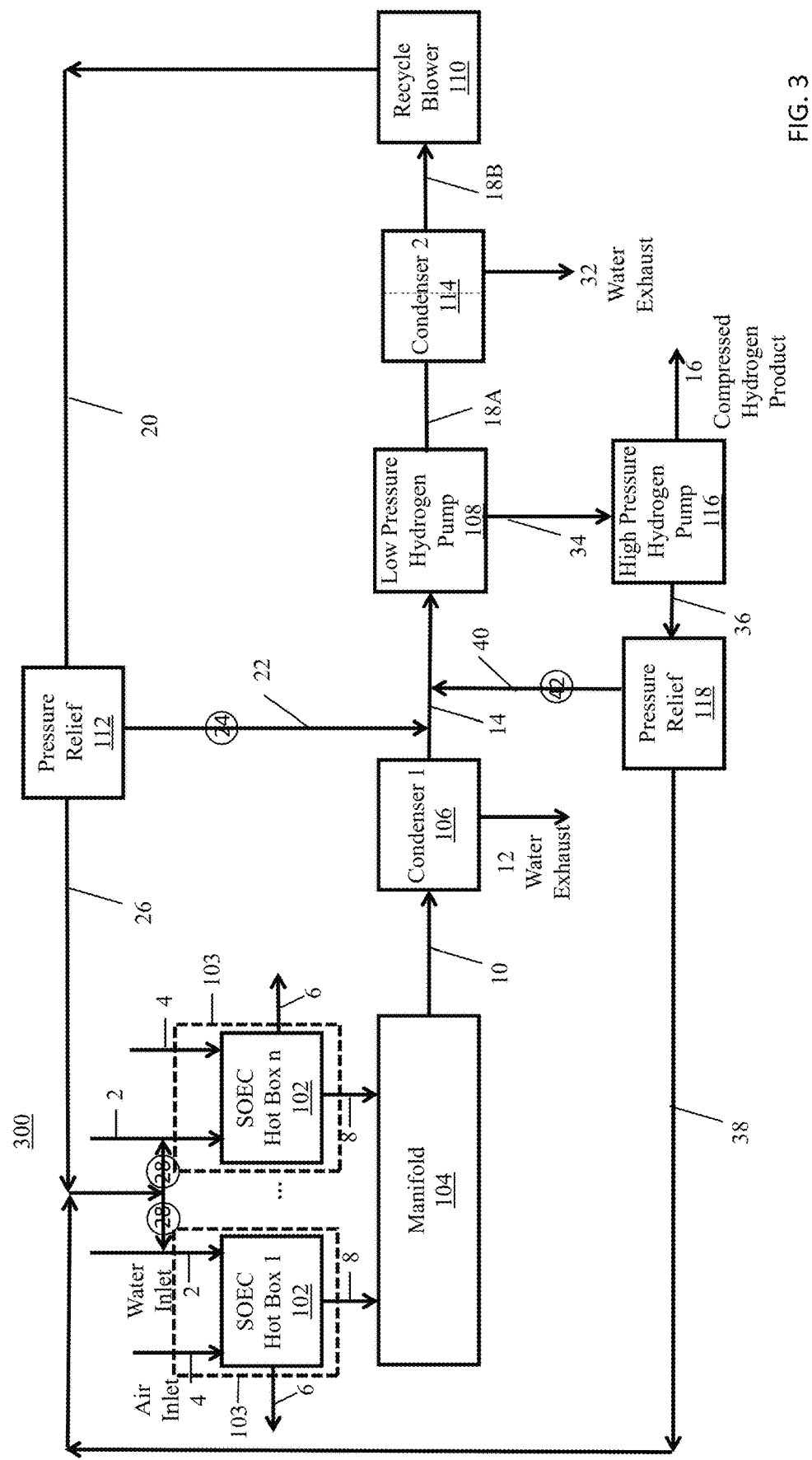

FIGS. 1, 2 and 3 are schematic diagrams of components of SOEC systems according to embodiments of the present disclosure.

DETAILED DESCRIPTION

As shown in FIG. 1, a SOEC system 100 includes at least one SOEC hot box 102. For example, there may be n hot boxes 102, where n is an integer between 1 and 100, such as 2 to 10, for example 4 to 8. Each hot box 102 may reside inside a hot box enclosure 103 containing additional balance of plant (BOP) equipment dedicated to that hot box. Each hot box 102 includes a plurality of SOECs, such as one or more SOEC stacks or columns. Each hot box 102 or hot box enclosure 103 may also include any other suitable balance of plant components, such as heat exchangers, water vaporizer, blower, conduits, valves, etc. Each hot box 102 may also contain an electric power input (e.g., power bus) which supplies the electricity to generate the electrolysis of water in the SOECs.

Each hot box 102 includes a water inlet conduit (e.g., pipe or manifold) 2 which provides a water inlet stream into the fuel inlet of the hot box 102. The water may be provided from conduit 2 to each SOEC fuel electrode in the hot box. Each hot box 102 may also contain an air inlet conduit 4 connected to an air inlet of the hot box 102. An air inlet stream may be provided from conduit 4 to each SOEC air electrode in the hot box. Conduit 4 may be connected to an air blower (not shown).

After a current or voltage is applied to each SOEC in the hot box 102, the SEOCs generate oxygen enriched air exhaust stream and a wet hydrogen product stream. The oxygen enriched air stream may be vented from an air outlet of each hot box 102 through a vent 6. The product stream is output from a product outlet of each hot box 102 through a product conduit 8. The product stream is a hot, wet mixture of hydrogen and water vapor, which contains about 70 to 90 volume percent hydrogen gas and 10 to 30 volume percent water vapor. The product stream may be at a temperature of 100 to 150 C and may have a pressure of 0.1 to 1 psig, depending on the backpressure required to flow through the downstream equipment components and conduits.

If plural hot boxes 102 are present in the system 100, then the product streams from the hot boxes 102 may be combined in a manifold 104 which is connected to the product conduits 8.

The hot gas mixture is outlet from the manifold 104 into a condenser 106 via conduit 10. The condenser may be cooled by a cooling medium, such as cooling water and/or air to condense water vapor to liquid water and to reduce the temperature of the hydrogen below 100 C, such as 50 to 70 C. The liquid water is removed from the condenser via a water exhaust conduit 12. The partially dehydrated product stream is provided from the condenser 106 to at least one hydrogen pump 108 via conduit 14. The at least one hydrogen pump 108 may comprise an electrochemical pump or pumps.

The at least one electrochemical hydrogen pump 108 may comprise a hydrogen pump and separator which electrochemically pumps pure hydrogen through a polymer membrane upon application of a current or voltage across the membrane. The at least one electrochemical hydrogen pump 108 may comprise a high pressure hydrogen separation and compression system available from Skyre, Inc. under the name "H2RENEW™" and/or described in U.S. Pat. No. 10,756,361 and/or 10,648,089. The at least one hydrogen pump 108 may include multiple pumps (e.g., plural separation membrane stacks) connected in series and/or in parallel to enable a higher overall recovery fraction of hydrogen and/or a higher throughput.

In one embodiment, the pump 108 may recover greater than 80% of the hydrogen in the dehydrated product stream and output greater than 99% pure compressed hydrogen product through a compressed hydrogen product conduit 16. For example, the compressed hydrogen product may be at least 99.99% pure (i.e., dry) hydrogen which is pressurized to a pressure 15 psig to 10,000 psig, such as 15 psig to 2,000 psig, for example 15 psig to 150 psig. The compressed hydrogen product may be stored or used without additional mechanical compression or drying.

The unpumped effluent from the hydrogen pump 108 contains mainly water (e.g., water vapor and/or liquid water) and remaining hydrogen that was not separated from the dehydrated product stream in conduit 14. For example, the unpumped effluent may contain 1 to 15 volume percent hydrogen, such as 1 to 10 volume percent hydrogen, and remainder water and other impurities that are typically contained in water. The unpumped effluent is provided from the hydrogen pump 108 into a recycle blower and/or compressor 110 via conduit 18.

The unpumped effluent stream may be recycled by the blower 110 into a recycle conduit 20. The unpumped effluent may be compressed to 2-15 psig by the blower and/or compressor 110. The pressure may be selected to keep the resulting dew point below unintentional water condensation. The higher the pressure, the hotter the outlet temperature due to the heat of compression. It may be desirable to compress the unpumped effluent to a higher pressure in order for the compressed effluent to be hot enough to avoid accidental condensation in the recycle conduit 20. One or more optional additional condensers may be located on conduits 18 and/or 20, as will be described in more detail below with respect to FIG. 2.

An optional pressure relief component (such as a pressure relief valve, or back pressure regulator) and/or passive liquid water knockout component (e.g., condensation plate and/or gravity separator) 112 may be provided in the recycle conduit 20 to control the pressure of the unpumped effluent and/or to passively remove some of the liquid water from the unpumped effluent. The unpumped effluent is then recycled from the component 112 upstream of the hydrogen pump 108 via return conduit 22. The return conduit 22 may contain a flow control component, such as a check valve 24. The unpumped effluent may be recycled into conduit 14 located upstream of the hydrogen pump 108 inlet and downstream of the condenser 106 outlet. Alternatively, the unpumped effluent may be provided into the manifold 104 and/or into conduit 10. The unpumped effluent is mixed with the product stream at a location upstream of the hydrogen pump 108. Therefore, the remaining hydrogen in the unpumped effluent may be recovered by the hydrogen pump 108 instead of being wasted.

FIG. 2 illustrates a system 200 of an alternative embodiment of the present disclosure in which at least a portion of the unpumped effluent is recycled into the hot box 102 via the water inlet stream in conduit 2. The system 200 may also optionally include at least one second condenser 114 located on conduit 18 between the hydrogen pump 108 unpumped effluent outlet and the blower 110. Portion 18A of conduit 18 connects the hydrogen pump 108 to the second condenser 114, and portion 18B of conduit 18 connects the second condenser 114 to the blower 110. The at least one condenser 114 may comprise two condensers located in series. The upstream condenser may be a water or air cooled condenser, and the downstream condenser may be refrigerated condenser located downstream from the water or air cooled condenser. The unpumped effluent is first cooled as much as possible with ambient temperature based cooling media (e.g., air or cooling water). It is then cooled in the refrigerated condenser to less than 5 C, such as about 3 C to maximize water removal without dealing with complexity of freezing. The condensed water is removed from the second condenser 114 via a water exhaust conduit 32. Water knockout may be integrated into the design of the second condenser(s) 114 or included as a separate component downstream of the second condenser(s) 114. The condensed water from conduits 12 and 32 may be subjected to water purification and/or reuse.

The dried unpumped effluent containing hydrogen and residual water is provided from the second condenser 114 through portion 18B of conduit 18 into the blower/compressor 110. The dried unpumped effluent is compressed to 2-15 psig with the blower/compressor 110 and provided into the recycle conduit 20. The higher the pressure of the dried unpumped effluent, the hotter the outlet temperature due to the heat of compression. It may be desirable to compress the dried unpumped effluent to a higher pressure in order for the compressed effluent to be hot enough to avoid accidental condensation in conduit 20. The lower temperature of the condensers also serve to lower the water content of the stream in conduit 20, thereby also reducing the likelihood of inadvertent water condensation.

The low pressure, nearly dry effluent may be recycled from conduit 20 through the pressure relief component 112 back into the SOEC hot boxes 102 via return conduit 26. The effluent may comprise only about 500 to 10,000 ppm water and remainder hydrogen and unavoidable impurities. The return conduit 26 may recycle the effluent into the water inlet conduit 2 outside the hot box 102 and/or inside the hot box 102. In this embodiment, the SOECs in the hot box 102 operate on an inlet stream containing a mixture of water and recycled effluent which contains primarily hydrogen. Optionally, a flow controller 28, such as a mass flow controller (MFC) or a proportional solenoid valve (PSV) may be located between the return conduit 26 and the water inlet conduit 2 to control the amount of hydrogen that is being recycled into the water inlet conduit 2. The flow controller 28 and the blower 110 may be controlled by a control unit, such as a computer or a dedicated logic chip. Any excess recycled hydrogen may be returned via conduit 22 upstream of the hydrogen pump 108 as a feed stream for the hydrogen pump. For small hydrogen pump recycle flowrates, the dewpoint of the hydrogen pump inlet stream is relatively unchanged with the injection of nearly dry recycled hydrogen, so no humidification of the recycled effluent stream is required. If a substantial recycle flow to the hydrogen pump 108 is employed, then the effluent stream in conduit 22 is either re-humidified or diverted upstream of first condenser 106 and/or the second condenser 114.

FIG. 3 illustrates a system 300 of another alternative embodiment of the present disclosure which includes lower pressure and higher pressure hydrogen pumps to increase the hydrogen recovery percentage. Specifically, the at least one hydrogen pump 108 may be configured to pump hydrogen to a relatively low pressure (e.g. 15-150 psig) into a hydrogen outlet conduit 34. The compressed hydrogen product from the relatively low pressure hydrogen pump (i.e., lower pressure pump) 108 is fed to at least one relatively high pressure hydrogen pump (i.e., higher pressure pump) 116 through conduit 34, assuming the water content was still suitable. The unpumped effluent from the lower pressure pump may be provided into conduit 18 for recycling into the lower pressure pump 108 and/or into the hot boxes 102 as described above with respect to systems 100 and 200.

The higher pressure pump 116 outputs a pumped compressed hydrogen product into conduit 16. The compressed hydrogen product in conduit 16 is compressed to a relatively high pressure (e.g., 200 to 10,000 psig). The unpumped effluent containing relatively dry hydrogen and a negligible amount of residual water is provided from the higher pressure pump 116 to a hydrogen recycle conduit 36. The unpumped effluent can be provided from the hydrogen recycle conduit 36 through an optional pressure relief component 118 into the water inlet conduits 2 of the hot boxes 102 via return conduit 38 and/or into conduit 14 upstream of the lower pressure pump 108 inlet via conduit 40. In system 300, hydrogen may be recycled to the hot boxes 102 by one of conduits 26 or 38. Thus, conduit 26 may be omitted in the system 300 if hydrogen is recycled to the hot boxes 102 by the return conduit 38. Alternatively, but less preferably, conduit 26 may be present in system 300 and hydrogen may be recycled to the hot boxes 102 by both conduits 26 and 38. The conduit 40 may contain a flow control component, such as a check valve 42. Thus, a refrigerated condenser may be omitted by using the two hydrogen pumps 108 and 116 to recycle a drier hydrogen stream to the hot boxes 102.

If the pumped product in conduit 34 from the lower pressure pump 108 is not suitable as a feed to the higher pressure pump 116, then the higher pressure pump 116 may be placed downstream of the unpumped effluent outlet of the lower pressure pump 108 or upstream of the lower pressure pump 108 inlet. For example, the higher pressure pump 116 may be placed on conduit 18 (e.g., on portion 18A or portion 18B of conduit 18) or on conduit 14. Alternatively, if the pumped product from the lower pressure pump 108 is too dry to feed into the higher pressure pump 116, then the lower pressure pump 108 and the higher pressure pump 116 may be connected to conduit 14 in parallel instead of in series.

Thus, the systems 100, 200 or 300 may continuously recycle the product stream output from each hot box 102 until essentially all hydrogen from the product stream is provided into conduit 16 as compressed hydrogen product. Given that the water inlet stream in conduit 2 may contain small amounts of dissolved air, there is the potential for a buildup of inert species, including, but not limited to nitrogen and/or argon, in the systems 100, 200 or 300. Thus, an optional small (batch or continuous) inert species purge outlet may be provided anywhere in the recycle loop, such as in conduit 10 and/or portion 18B of conduit 18.

There is no recycled hydrogen produced during the start-up of the SOECs in the hot boxes 102. In one embodiment, if hydrogen is required during the start-up period of SOEC operation, then hydrogen may be stored in hydrogen storage vessels (e.g., hydrogen cylinders/tanks). These storage vessels may be provided from an outside hydrogen source and/or may be filled with hydrogen during prior operation of the systems 100, 200 or 300. Thus, hydrogen is provided into the water inlet conduit 2 during start-up period of the SOECs and/or during steady-state operation if the pressure in the return conduits 26 or 38 drops below the required hydrogen pressure for SOEC operation, as sensed by a sensor and determined by a controller.

Optionally, buffer tanks may be located on one or more conduits in the systems 100, 200 or 300. The buffer tanks provide additional flow capacity if the hydrogen flowrate produced from the hot boxes 102 does not match a throughput of the hydrogen pump 108 and/or other hydrogen recycle components.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A solid oxide electrolyzer system, comprising:
   a water inlet conduit fluidly connected to a hot box containing at least one solid oxide electrolyzer cell (SOEC);
   at least one hydrogen pump;
   at least one product conduit fluidly connecting a product outlet of the hot box to an inlet of the at least one hydrogen pump;
   a compressed hydrogen product conduit connected to a compressed hydrogen product outlet of the at least one hydrogen pump; and
   at least one recycle conduit connected to an unpumped effluent outlet of the at least one hydrogen pump and configured to recycle at least a portion of the unpumped effluent upstream of the at least one hydrogen pump;
   at least one additional higher pressure hydrogen pump fluidly connected to the compressed hydrogen product conduit and configured to generate an additional higher pressure compressed hydrogen product and additional unpumped effluent; and at least one hydrogen recycle conduit fluidly connected between an additional unpumped effluent outlet of the at least one additional higher pressure hydrogen pump and the water inlet conduit.

2. The solid oxide electrolyzer system of claim 1, further comprising a condenser fluidly connected to the at least one product conduit.

3. The solid oxide electrolyzer system of claim 1, further comprising a blower configured to recycle at least the portion of the unpumped effluent to an inlet of the at least one hydrogen pump.

4. The solid oxide electrolyzer system of claim 1, further comprising a blower configured to recycle at least the portion of the unpumped effluent to the water inlet conduit.

5. The solid oxide electrolyzer system of claim 1, wherein the at least one hydrogen pump comprises an electrochemical hydrogen pump which generates a compressed hydrogen product comprising greater than 99 volume percent hydrogen.

6. A solid oxide electrolyzer system, comprising:
 a water inlet conduit fluidly connected to a hot box containing at least one solid oxide electrolyzer cell (SOEC), the water inlet conduit providing a water inlet stream to the SOEC;
 at least one hydrogen pump;
 at least one product conduit fluidly connecting a product outlet of the hot box to provide a wet hydrogen product stream from the SOEC to an inlet of the at least one hydrogen pump;
 a compressed hydrogen product conduit connected to a compressed hydrogen product outlet of the at least one hydrogen pump for generating a compressed hydrogen product;
 at least one recycle conduit connected to an unpumped effluent outlet of the at least one hydrogen pump and configured to recycle at least a portion of the unpumped effluent upstream of the at least one hydrogen pump;
 at least one additional higher pressure hydrogen pump fluidly connected to the compressed hydrogen product conduit and configured to generate an additional higher pressure compressed hydrogen product and additional unpumped effluent; and
 at least one hydrogen recycle conduit fluidly connected between an additional unpumped effluent outlet of the at least one additional higher pressure hydrogen pump and the water inlet conduit.

* * * * *